United States Patent Office 3,117,008
Patented Jan. 7, 1964

3,117,008
MANUFACTURE OF CHEESE
Robert R. Mauk, Evanston, Ill., assignor to National Dairy Products Corporation, New York, N.Y., a corporation of Delaware
No Drawing. Filed Feb. 13, 1961, Ser. No. 88,620
5 Claims. (Cl. 99—116)

The present invention relates, generally, to the manufacture of cheese, and more particularly, it relates to a process for the manufacture of cheeses having body, texture, and flavor which are typical of pasta filata type cheeses, such as provolone and mozzarella cheeses.

Pasta filata is a generic term for a group of Italian cheeses including mozzarella, provolone, scamorza, and caciocavallo. These cheeses characteristically have a close, unbroken texture and are characteristically prepared by working the cheese in hot water or hot brine. The body of pasta filata cheeses ranges from soft to rubbery, and they have traditionally been marketed in spherical, pear, or salami shapes. Some varieties, such as provolone, are smoked.

Mozzarella may be taken as a representative pasta filata cheese. In the traditional mozzarella cheese make procedure, milk is placed in a vat, starter is added thereto at a relatively high level and the milk is ripened for a short period to develop a high acid in the make. The milk is then set with rennet, and the curd is cut and cooked. The whey is drawn off, and the curd is cheddared and milled in a conventional manner. After milling, the whey has an acidity of between about .32 to about .35.

The curd is thereafter formed into at traditional shape by heating the curd in hot water and working it into a desired shape. In this connection, the high acidity in the curd permits working of the curd. The curd is placed in an equal weight of scalding water (190° F. to 200° F.), and is worked in the water until it attains a smooth, taffy-like consistency. Excess water is then drained off and individual pieces of curd are cut off and dipped into hot water for a short time until they become plastic. The piece is then stretched and pulled by hand and formed into a spherical or ovoid shape. If the curd cools during working, it loses its plasticity and it may be necessary to reheat the curd in water until it again attains a workable plasticity. After considerable working, a cheese having a close texture and a smooth, shiny surface is formed. The cheese is salted by dipping in brine, and the cheese may then be dipped in paraffin, oiled or wrapped, and stored at curing temperatures to develop full flavor.

The foregoing procedure, which is generally typical of the procedure for working other pasta filata cheeses, has been improved in recent years by the use of mechanical working of the curd to obtain the characteristic texture of cheeses of the pasta filata type. However, a substantial portion of this type of cheese is still manufactured by hand-working techniques. In this connection, the curd is sometimes cured prior to its being worked into appropriate shapes. The cured curd is sold to cheese retailers who then work and form sufficient of the curd for a single day's sales.

The composition of pasta filata cheeses will vary widely, depending upon the techniques of the individual cheese maker or cheese retailer. For example, working of the cheese in scalding water results in the loss of a considerable amount of fat in the water, and the fat content of the resulting cheese will vary accordingly.

Federal standards exist at the present time for provolone cheese, and these standards specify that provolone cheese shall comprise a minimum of 45% fat (dry basis), and shall comprise a maximum of 45% moisture. Federal standards have not presently been set for all other pasta filata cheeses.

Because of the laborious techniques involved in the traditional manufacturing procedure, pasta filata cheeses have heretofore been relatively costly.

Accordingly, it is an object of the present invention to provide a novel method for the manufacture of pasta filata type cheeses. It is a further object of the present invention to provide an economical process for making pasta filata types cheeses. It is another object of the present invention to provide a method for the manufacture of cheeses having body and texture typical of pasta filata cheeses, which method results in increased retention of natural cheese fats. It is a further object of the present invention to provide a method for the manufacture of cheeses having body, texture and flavor typical of pasta filata cheeses, which method provides a product of controlled and predictable composition. An additional object of the present invention is to provide a method for the manufacture of pasta filata type cheeses, which method does not require working the cheese curd in hot water. Other objects and advantages of the present invention will be apparent from the following description and examples.

Generally, the method of the present invention comprises preparing a curd by a low-acid, low temperature make procedure to provide a curd of relatively low and controlled acidity which includes biologically active agents, subjecting the curd to vacuum conditions, and curing the curd for a period sufficient to provide a cheese having smooth and continuous texture. In accordance with the present invention, smoke flavor and enzymes may be added to the cheese, when appropriate, to provide a particular flavor and different body. Cheese made in accordance with the present invention has a clean distinctive flavor, desirable meltdown, slice-ability, and keeping quality. The cheese is uniform in composition.

The following features are believed to be important in attaining the objects of the present invention. First, the curd should be leached with water to provide an acidity in the whey of below about 0.08 percent. (As used throughout this specification, acidity is expressed as percent lactic acid equivalent.) Second, the curd should be subjected to vacuum conditions to aid in providing the desired body and texture. Third, biologically active acid-producing agents should be present in the curd at the beginning of the curing period, whereby protein breakdown in the curd proceeds to provide the desired body and texture. Such acid-producing agents may be bacterial or enzymatic in nature.

More particularly, in accordance with the present invention, the butterfat content of milk is suitably adjusted, and for most pasta filata type cheeses will be adjusted to below about 3.0 percent, and a *Streptococcus lactis* cheese starter is added thereto. The starter is utilized at a relatively low level in comparison with make procedures heretofore known for pasta filata cheeses. In this connection, the starter may be added at a level of about one percent, based on the milk, to provide an acid pickup of less than about 0.1 percent by addition of the starter.

The milk is then ripened, at conventional temperatures, sufficiently long to provide acid pickup. The milk is then set with rennet, and the curd is cut, in accordance with usual practices.

After the curd is cut, the curd is cooked to firm the curd and adjust its moisture content. It is important, in the practice of the present invention, that acid-producing agents in the curd are not substantially inactivated during the processing of the curd. It appears that temperatures in excess of about 105° F. substantially inactivate these agents for purposes of making pasta filata type cheeses in accordance with this invention. Accordingly, the curd is cooked at a temperature below about 105° F. and preferably below about 103° F.

Stirring of the curd in the whey is continued at the desired temperature until the curd has attained a desired degree of firmness, at which time the whey is drawn. In this connection, the acid pickup in the whey from the time the curd is cut, i.e., the cutting acid, until the time draw-off of the whey is begun, i.e., the drawing acid, is desirably below about 0.05 percent, and preferably is below about 0.04 percent.

Stirring of the curd is continued as the whey is drawn, at a rate sufficient to prevent matting of the curd. The acid pickup in the whey from the time draw-off is begun until the time the whey is fully drawn desirably is below about 0.07 percent, and preferably is below about 0.06 percent.

In any event, after the whey is drawn from the curd, the acidity of the whey in the curd is desirably below about 0.25 percent. This enables more effective leaching of the curd to provide the pasta filata type cheese of the present invention.

The curd is then leached by being submerged in water to reduce the acidity of the curd. The temperature of the water-curd mixture is adjusted to between about 65° F. and about 85° F. to aid in controlling the moisture content of the curd and to limit fat loss in the curd. The mixture is stirred for a short length of time, and the water is drawn off. As before indicated, this leaching step should reduce the acidity of the whey in the curd to below about 0.08 percent.

The curd is then salted, and smoke flavor or other flavoring may also be added at this time. The salted curd is pressed. The pressed curd is then subjected to vacuum treatment, as will be more fully described hereinafter.

In the practice of the present invention, the acidity of the whey in the curd about 16 to 20 hours after salting should be from about 0.75 percent to about 0.95 percent. If the acidity is below the indicated range, breakdown of the protein in the curd proceeds too slowly, and the cured cheese may not develop the desired texture, and whey leakage may occur. If the acidity is above the indicated range, the protein in the curd breaks down too rapidly, and the cured cheese tends to be gummy or sticky, and off-flavors may develop. Attainment of an acidity in the indicated range is influenced by the level and activity of the starter which is utilized, and by temperature conditions and treatment time during the make procedure.

In accordance with the present invention, the pressed curd is subjected to vacuum conditions after or during pressing. As pointed out hereinbefore, vacuum treatment of the curd is important to provide the desired texture of the cheese of the present invention. The hoops of pressed curd are placed in a chamber which is adapted for evacuation thereof by vacuum pumps or the like. Weights are placed atop the curd to aid in retaining a flat surface thereon, and the chamber is evacuated to a vacuum of about 26 or 27 inches of mercury. Greater or lesser vacuum may be employed if treatment time is suitably adjusted. The vacuum is maintained for about an hour, whereafter the pressure in the chamber is allowed to rise to atmospheric pressure over about a 5 to 10 minute period, and the hoops are removed.

After vacuum treatment of the curd, it is removed from the hoops and packaged. The curd is then cured at about 45° F. for two or three weeks or more. Depending upon the composition of the curd, body breakdown of the cheese will have begun at the end of this period, and the cheese will have a close, smooth body and texture, and may be cut, sliced and packaged for market distribution.

*Example I*

As an example of the practice of the present invention, cheese was prepared having body, texture, and flavor typical of mozzarella cheese. Seventeen thousand pounds of pasteurized milk, comprising about 1.8 percent fat, were introduced to a Cheddar-type cheese vat. One hundred and fifty pounds of *Streptococcus lactis* starter were added thereto, which raised the acidity of the milk from about 0.175 percent to about 0.18 percent.

Thereupon, the milk was allowed to ripen for about an hour at 88° F., at the end of which time the acidity of the milk had increased to about 0.186 percent. The milk was then set with rennet extract, and the resultant curd was cut into ⅜ inch cubes. The acidity of the whey at cutting was about 0.11 percent.

The curd was given a 15 minute stirout after cutting, whereupon cooking of the curd was begun. The curd was cooked to a temperature of 97° F. over a thirty minute period. Steam flow to the vat was cut off, and the curd was stirred for an additional half hour at about 95–97° F., at the end of which time the acidity of the whey was about 0.13 percent.

The curd and whey were then pumped to a drain table, where the whey was drawn off over a 30 minute period. At the end of this time the acidity of the whey was about 0.15 percent. The curd was stirred gently throughout this period to prevent matting.

The curd was then submerged in tap water (about 55° F.) and the temperature of the curd and water was adjusted to about 67° F. The curd and water was stirred at the latter temperature for about ten minutes, and the water was then drawn off.

Fory-seven pounds of salt was sprinkled over the curd, and was distributed uniformly by stirring for a short time.

The curd was then filled into hoops, and the curd was pressed overnight in a hydraulic cheese press at a pressure of ten pounds per square inch. In the morning the acidity of the whey in the curd was 0.76 percent. The hoops were removed from the press, and the bandages were dressed.

The hoops were then placed in a vacuum chamber, with a 50 pound weight atop the curd in each hoop, and the chamber was evacuated to a vacuum of about 27 inches of mercury. The chamber was maintained at this vacuum for one hour, whereupon the vacuum was broken slowly over an 8 minute period.

The blocks of curd were removed from the hoops, and wrapped in Parakote, which is a commercially available wrapping material. The curd was cured for 4 weeks at 45° F.

The cured cheese had a very close texture, good meltdown and sliceability, and had a clean, slightly acid flavor. The cheese maintained these desirable characteristics for at least three months. The cheese comprised 49.3% moisture, and 30.4% fat (dry basis).

*Example II*

As a further example of the practice of the present invention, cheese was prepared which had body, texture, and flavor typical of provolone cheese. One thousand pounds of heat-treated milk, comprising about 2.8 percent fat, were introduced to a Cheddar-type cheese vat. Ten pounds of *Streptococcus lactis* starter were added thereto, which raised the acidity of the milk from about 0.165 percent to about 0.17 percent.

The milk was allowed to ripen for about one-half hour at 88° F., at the end of which time the acidity of the milk had increased to about 0.18 percent. Twenty grams of Capalase Lipase "K," which is a commercially available lipase enzyme, was added to the milk. The milk was then set with rennet extract, and the curd was cut into ⅜ inch cubes. The cutting acidity of the whey was about 0.115 percent.

The curd was given a 15 minute stirout after cutting, whereupon cooking of the curd was begun. The curd was cooked to a temperature of 102° F. over a 30 minute period. Steam flow to the vat was cut off, and the curd was stirred for an additional hour at about 100–102° F., at the end of which time the acidity of the whey was about 0.145 percent.

The curd and whey was then pumped to a drain table, where the whey was drawn off over a 20 minute period, at the end of which time the acidity of the whey was about 0.19 percent. The curd was stirred gently throughout this period to prevent matting.

The curd was then submerged in tap water (about 70° F.), and the temperature of the curd and water was adjusted to about 82° F. The curd and water were stirred at the latter temperature for about 10 minutes, whereupon the water was drawn off.

Three pounds of salt, which had been blended with 60 milliliters of a liquid smoke preparation, were sprinkled on the curd and the curd was stirred sufficiently to work the salt into the cheese.

The curd was then placed in hoops, and the curd was pressed overnight in a hydraulic cheese press at a pressure of about 10 pounds per square inch. In the morning, the acidity of the whey in the curd was about 0.82 percent. The hoops were removed from the press, and the bandages were dressed.

The curd was then subjected to vacuum treatment in the same manner as set forth in Example I. Following the vacuum treatment, the blocks of curd were removed from the hoops and wrapped in Parakote.

The cheese was cured for 60 days at 45° F. There was provided a cheese having a close texture, and which had body and flavor typical of that of provolone cheese. The cheese sliced well, and comprised about 41.6 percent moisture and about 27.3 percent fat (dry basis).

It will be seen from the foregoing examples that there is provided a novel method for the manufacture of pasta filata type cheeses. Laborious and costly hand-working of the curd has been eliminated, and the method is well suited for large-scale production facilities. Cheeses made in accordance with the present invention have body, texture, and flavor typical of pasta filata cheeses and cheese of uniform composition is obtained.

Variations from the foregoing description and examples to provide pasta filata type cheeses having a particular body and flavor will be apparent to those skilled in the cheese-making art. As such, they are deemed to be within the scope of the present invention, and need not be set forth herein.

Various of the features of the present invention are set forth in the following claims.

What is claimed is:

1. A method for the manufacture of pasta filata type cheeses, comprising the steps of preparing a curd which includes active acid-producing agents, cooking the curd at a temperature below that at which the acid-producing agents are substantially inactivated, leaching the curd to provide an acidity of less than about 0.08 percent, pressing the curd, subjecting the pressed curd to vacuum conditions, and curing the curd for a period sufficient to provide a cheese having a smooth and continuous texture.

2. A method for the manufacture of pasta filata type cheeses, comprising the steps of preparing a curd which includes active acid-producing agents, cooking the curd below about 105° F., leaching the curd to provide an acidity of less than about 0.08 percent, pressing the curd, subjecting the pressed curd to vacuum conditions, and curing the curd for a period sufficient to provide a cheese having a smooth and continuous texture.

3. A method for the manufacture of pasta filata type cheeses, comprising the steps of preparing a curd which includes active acid-producing agents, cooking the curd below about 105° F., leaching the curd to provide an acidity of less than about 0.08 percent, salting the curd, the curd having an acidity of from about 0.75 percent to about 0.95 percent about 16 to 20 hours after said salting, pressing the curd, subjecting the pressed curd to vacuum conditions, and curing the curd for a period sufficient to provide a cheese having a smooth and continuous texture.

4. A method for the manufacture of pasta filata type cheeses, comprising the steps of preparing a curd which includes active acid-producing agents, cooking the curd below about 103° F., leaching the curd to provide an acidity of less than about 0.08 percent, pressing the curd, subjecting the pressed curd to vacuum conditions, and curing the curd for a period sufficient to provide a cheese having a smooth and continuous texture.

5. A method for the manufacture of pasta filata type cheeses, comprising the steps of preparing a curd which includes active acid-producing agents, cooking the curd below about 103° F., leaching the curd to provide an acidity of less than about 0.08 percent, salting the curd, the curd having an acidity of from about 0.75 percent to about 0.95 percent about 16 to 20 hours after said salting, pressing the curd, subjecting the pressed curd to vacuum conditions, and curing the curd for a period sufficient to provide a cheese having a smooth and continuous texture.

References Cited in the file of this patent

UNITED STATES PATENTS 2,871,126    Smith et al.   _____ Jan. 27, 1959

OTHER REFERENCES

Sanders: Cheese Varieties and Descriptions, M.S. Dept. of Agriculture Handbook No. 54. December 1953, pp. 20, 21, 80, 81, 97, and 98.